M. SCHAFFNET.
ROTATABLE SPRINKLER CONNECTION.
APPLICATION FILED OCT. 17, 1911.
1,019,922.
Patented Mar. 12, 1912.
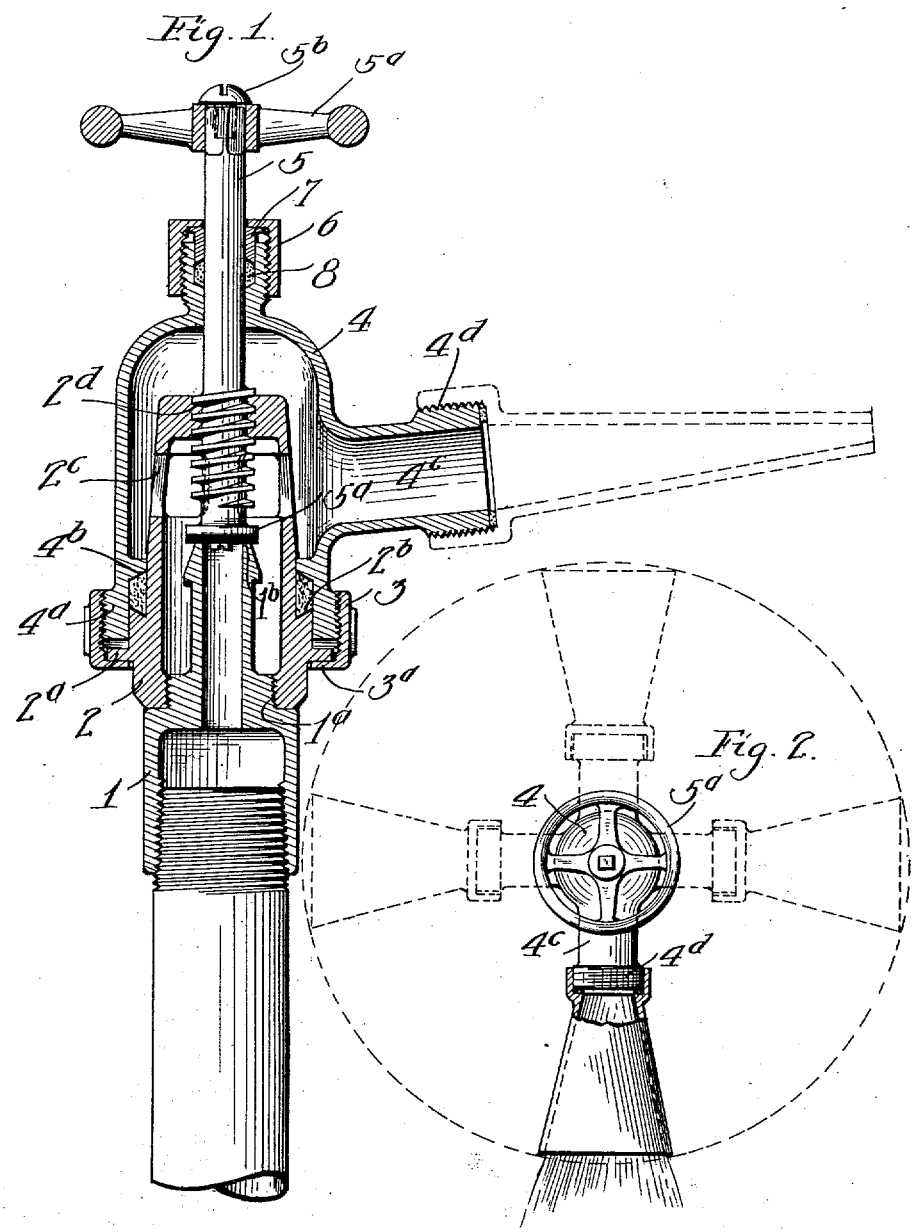

UNITED STATES PATENT OFFICE.

MINNIE SCHAFFNET, OF SAN DIEGO, CALIFORNIA.

ROTATABLE SPRINKLER CONNECTION.

1,019,922. Specification of Letters Patent. Patented Mar. 12, 1912.

Application filed October 17, 1911. Serial No. 655,194.

*To all whom it may concern:*

Be it known that I, MINNIE SCHAFFNET, a citizen of the United States, and a resident of San Diego, in the county of San Diego and State of California, have invented certain new and useful Improvements in Rotatable Sprinkler Connections, of which the following is a specification.

My invention relates to a rotatable connection or faucet for sprinklers, and more particularly to be used without any hose connection, and the objects of my invention are, first, to provide a connection of this class, which may be rotated radially, so as to throw the water in any direction laterally, second, to provide such a connection with means for closing or reducing the flow of water through the sprinkler, third, to provide such a connection to which a sprinkler may be directly attached and sprinkle the ground in a full radius around said connection, thus eliminating the use of the hose in such cases.

With these and other objects in view as will appear, my invention consists of certain novel features of construction, combination and arrangement of parts, as will be hereinafter described in detail and particularly set forth in the appended claims, reference being had to the accompanying drawings, and to the characters of reference thereon, which form a part of this specification, in which:—

Figure 1 is a sectional view of my connection shown mounted vertically on the top end of a water pipe, and showing by dotted lines a sprinkler connected thereto, Fig. 2 is a top or plan view thereof showing by dotted lines some of the various positions in which the outlet of the connection may be placed.

Similar characters of reference refer to similar parts throughout the several views.

This spinkler connection consists of a pipe connection 1, sleeve 2, nut 3, outer casing 4, valve 5, stuffing box nut 6, and stuffing box gland 7.

The pipe connection 1 is internally threaded, adapted to screw on the end of a pipe or other liquid conductor. The upper portion of this connection 1 is reduced and externally threaded at $1^a$, then further reduced and extending upwardly, forms a valve-seat $1^b$ on its top end. On this threaded portion $1^a$ is screwed a sleeve 2, which is provided with an annular flange $2^a$, and is reduced just above this flange, leaving a bevel serface $2^b$ adapted for packing. This sleeve 2 extends upwardly therefrom, and is provided above the valve seat portion $1^b$ of connection 1, with a plurality of ports $2^c$ adapted for the exit of the liquid through the walls of said sleeve. Just above these ports $2^c$ is provided an internal thread $2^d$, which is preferably a square thread. Over the upper portion of this sleeve is placed an outer casing 4, the lower portion of which is externally threaded and adapted for the internal threads of nut 3, which is adapted to screw on to this lower portion. The lower portion of the nut 3 is provided with a flange $3^a$, which is adapted to fit against the flange $2^a$ of the sleeve 2. On the inner surface of this outer casing 4 is provided a beveled surface $4^b$. Between these two surfaces $2^b$ and $4^b$ is provided packing of a suitable nature, so that when the nut 3 is screwed tightly on the lower portion $4^a$ of the outer casing, the packing between these two surfaces $2^b$ and $4^b$ is compressed, thus forming a tight joint between the sleeve and outer casing.

Extending laterally from the outer casing, is the extended portion $4^c$ adapted for the exit of the water. This extended portion is provided with external threads $4^d$ adapted for the threads of a sprinkler or hose as desired. In the upper portion of this outer casing 4 and extending vertically therein, is valve stem 5, which is provided on its lower end with a gasket $5^a$ adapted to fit the valve seat $1^b$, and it is also provided with a square thread adapted to fit the square thread $2^d$ in the upper end of the sleeve 2. It is provided on its upper end with hand wheel $5^a$ attached thereto by means of a screw $5^b$. This wheel $5^a$ is for the purpose of facilitating the turning of the valve stem 5. On the upper end of the outer casing 4 is provided a stuffing box composed of gland 7 and nut 6. The gland is adapted to fit into the upper end of said casing, and the nut 6 is adapted to fit over the external thread on said upper end. This stuffing box is provided with suitable packing 8.

Though I have shown and described a particular construction, and arrangement of parts, I do not wish to be limited to this particular construction and arrangement, but desire to include in the purview of my invention, the construction and arrangement of parts substantially as set forth in the appended claims.

It is obvious that with the construction as shown and described, there is provided a sprinkler connection for water pipes, and the like, the exit of which may be rotated; that the flow of the liquid may be increased or reduced as desired and that sprinkling may be done in all directions around said connection without the use of a hose.

Having thus described my invention, what I claim as new and desire to secure by Letters Patent is:—

1. A rotatable sprinkler connection, comprising, a pipe connection provided with a valve seat on its upper extended end, a sleeve provided with a plurality of outlet ports screwed on to said pipe connection, an outer casing provided with a lateral opening adapted to fit over said sleeve, provided with a space for packing, a nut adapted to connect with said sleeve and screw on to said outer casing for compressing the packing, a valve stem adapted to screw into the upper end of said sleeve and on to said valve seat, and a stuffing box around said valve stem on the upper end of said outer casing, all substantially as set forth.

2. A rotatable sprinkler connection, comprising, an outer casing, a sleeve provided with a plurality of ports near its upper end adapted to fit into said casing, forming a space for packing and provided with a flange, a nut adapted to provide a rotatable bearing for the casing and to compress said packing, a pipe connection adapted to screw into the lower end of said casing and connect with the lower extended end of said sleeve, adapted to connect with a valve stem screwed into the upper end of said sleeve, and a stuffing box for closing the joint between said outer casing and said valve stem, all substantially as set forth.

3. A rotatable sprinkler connection, comprising an outer casing provided with a lateral outlet, a sleeve adapted to fit into said outer casing provided with a plurality of ports adapted to conform to the outlet in said outer casing, means for forming a liquid-tight but rotatable joint between said outer casing and said sleeve, means in connection with said sleeve for connection to any liquid conductor adapted for connection with a valve stem forming a valve seat in said sleeve, and means in said casing for forming a liquid-tight joint around said valve stem, all substantially as set forth.

In testimony whereof, I have hereunto subscribed my name in the presence of two subscribing witnesses.

MINNIE SCHAFFNET.

Witnesses:
ALICE C. DURKIN,
JOHN EASTWOOD.

Copies of this patent may be obtained for five cents each, by addressing the "Commissioner of Patents, Washington, D. C."